Jan. 5, 1954

E. A. ZIELINSKI 2,664,775

HARMONICA APPARATUS

Filed July 25, 1951

Inventor:
Edward A. Zielinski
By Wallace and Cannon
Attorneys

Patented Jan. 5, 1954

2,664,775

UNITED STATES PATENT OFFICE 2,664,775

HARMONICA APPARATUS

Edward A. Zielinski, Berwyn, Ill., assignor of one-half to Joseph S. Kishel, Brookfield, Ill.

Application July 25, 1951, Serial No. 238,461

3 Claims. (Cl. 84—1.04)

This invention relates to harmonica apparatus and particularly to a holder unit which is adapted to hold an harmonica and an amplifier pickup therefor.

More particularly, this invention relates to a holder unit or casing in which an conventional harmonica may be removably mounted in position of use relative to an amplifier pickup also mounted in the holder unit or casing to the end that the complete assembly may be held readily in the hands of the player and the music played upon the harmonica picked up and amplified by means of a conventional amplifier system associated with and electrically connected to the amplifier pickup.

An object of the invention is to provide a novel holder unit or casing which is adapted to hold an harmonica and an amplifier pickup associated therewith so that the harmonica may be played and the music produced thereby picked up and amplified by means of a suitable amplifier apparatus electrically connected with the amplifier pickup.

Another object of the invention is to provide a novel combination of an harmonica, amplifier pickup therefor, and a holder unit or casing in which the harmonica and amplifier are mounted in such a manner that the entire assembly may be readily held in the hands of the player during the operation of playing upon the harmonica and so that the music produced thereby will be picked up by the amplifier pickup and amplified.

Other and further objects of the present invention will be apparent from the following description and claims and are illustrated in the accompanying drawing which by way of illustration, shows a preferred embodiment of the present invention and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

Figures 1, 2, 3, 4, 5:
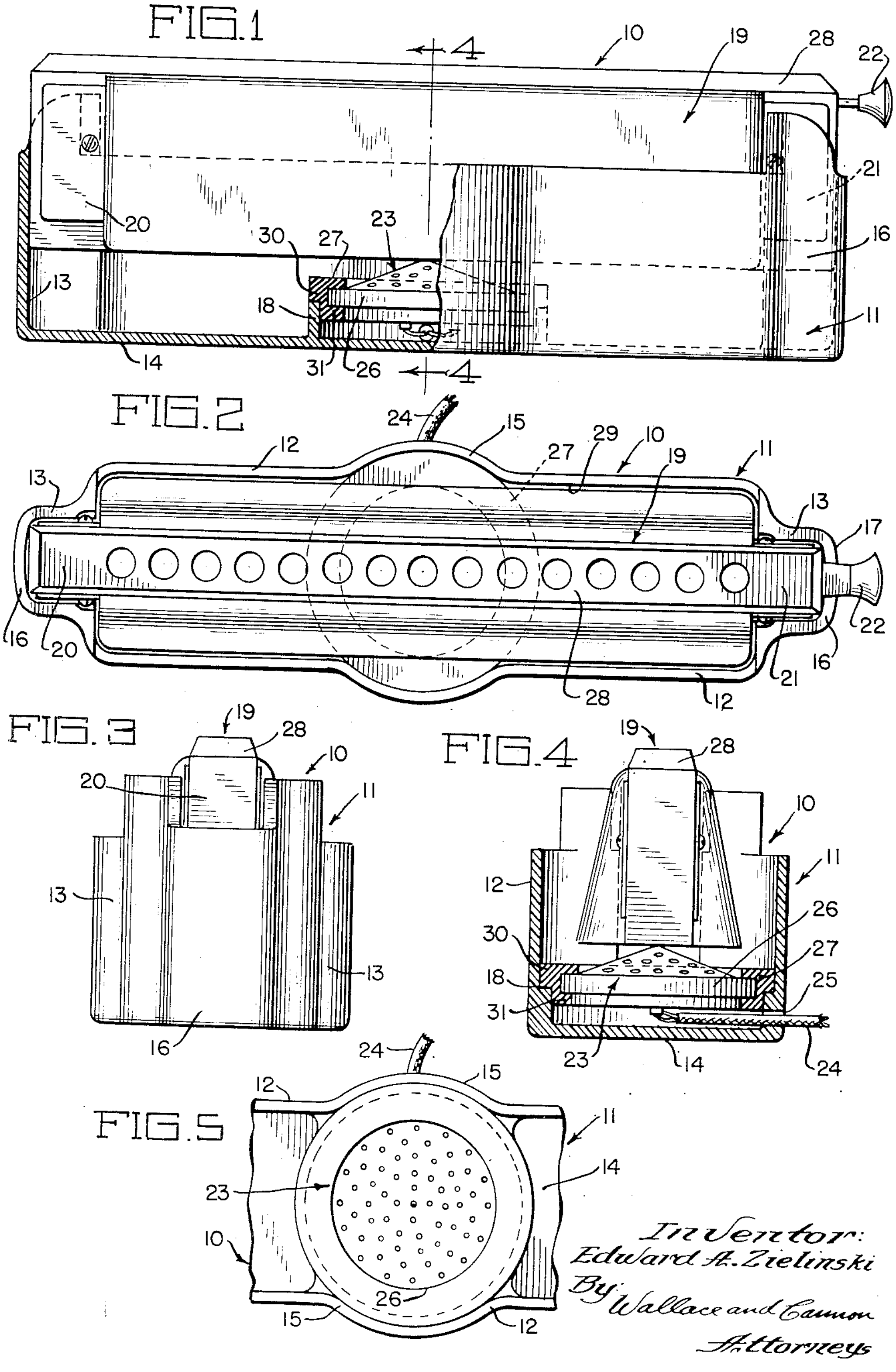
Fig. 1 is an elevational view of the new holder unit, portions of one wall thereof being broken away to reveal the structure thereof, an harmonica and amplifier pickup being shown as being mounted in position of use therein.
Fig. 2 is a top plan view of the new holder unit, harmonica, and amplifier pickup mounted in position of use therein.
Fig. 3 is an end elevational view of the assembly shown in Figs. 1 and 2.
Fig. 4 is a transverse vertical sectional view on line 4—4 in Fig. 1, showing the arrangement of the harmonica and amplifier pickup in the new holder unit.
Fig. 5 is a fragmentary top plan view showing the mounting of the amplifier pickup in the new holder unit.

A preferred embodiment of the new harmonica unit is illustrated in the drawing, wherein it is generally indicated at 10, and comprises an elongated and generally rectangular-shaped holder unit in the form of a casing or housing 11 which may be made of any suitable material such, for example, as any suitable synthetic plastic resinous material, light metal, such as aluminum, or the like. The casing 11 includes spaced generally parallel side walls 12, spaced end walls 13, and a bottom wall 14, the housing or casing 11 having an open top or throat 29 for the reception of an harmonica, which is generally indicated at 19, and which includes an elongated body having spaced end portions 20 and 21 and a manual control slide 22, and a playing face 28. The holder casing or housing 11 is also adapted to receive and to hold an amplifier pickup, which is generally indicated at 23, and which includes a generally annular-shaped body 26 on which a resilient rubber or like resilient ring 27 is removably mounted (Figs. 1 and 4).

As shown in the drawing, each of the side walls 12 of the holder casing 11 has an outwardly flared boss portion 15 formed centrally therein between the ends thereof and each of the end walls 13 of the casing 11 has an outwardly projecting guide boss portion 16 formed therein, of relatively reduced width, compared to the width of the holder casing 11, for a purpose which will be described presently.

As shown in Fig. 2 of the drawing, one of the end wall bosses 16 (right hand end as seen in Fig. 2) has a vertically extending slot 17 formed therein and extending partially downwardly therein, for a purpose which will be described presently.

The bottom wall 14 of the holder casing 11 has an upwardly extending generally annular-shaped rib 18 formed therein, and this upwardly extending generally annular-shaped rib 18 is concentric with the outwardly flared boss portions 15 of the side walls 12, for a reason which will be explained presently.

In the use of the new harmonica holder unit, the harmonica 19 may be slidably and removably inserted into the holder casing 11 in such a manner that the top of the harmonica 19 (as seen in the drawing) is arranged centrally and longitudinally of the holder casing 11, with the laterally projecting end portion 20 of the harmonica projecting into the guide boss 16 in one end wall 13 of the holder casing 11, and with the other end portion 21 of the harmonica 19 projecting into the other guide boss 16 in the other end wall 13 of the holder casing 11. When the harmonica 19 is so disposed the laterally projecting handle of the control slide 22 of the harmonica extends vertically through the slot 17 in the adjacent end wall 13 of the casing 11 and so that the harmonica 19 is positioned in the manner shown in the drawing and in such a position as will enable it readily to be played when the assembled holder casing 11 and harmonica 19, and amplifier pickup 23, are held in the player's hands.

In order to amplify the music produced by the harmonica 19, a conventional amplifier microphone pickup unit 23 is mounted in the well or receptacle provided therefor by the upwardly extending generally annular rib 18 on the bottom wall 14 of the casing 11 and the outwardly flared portions 15 of the side walls 12 of the casing 11 which cooperate to form a receptacle or well for the reception of the amplifier pickup unit 23. When the parts are so arranged the resilient rubber or like ring 27 is slightly compressed and frictionally engages and grips the generally annular-shaped rib or wall 18 and the outwardly flared central portions of the side walls 12 of the holder casing 11. This resilient clamping ring 27 has an annular frame 30 formed therein and it also has a depending annular skirt portion 31 which projects downwardly inside the rib 18 (Figs. 1 and 4).

Thus it will be seen that the generally annular-shaped rib 18 and the resilient rubber or like ring 27 provide a means for removably holding the generally annular-shaped body 26 of the amplifier pickup unit 23 centrally in the casing 11 and between the inner side of the harmonica and the bottom wall 14 of the casing 11.

It will be noted that when the harmonica 19 is in position of use in the holder casing 11 it projects centrally and longitudinally through the casing 11 with the bottom thereof resting upon the apex of the body 26 of the microphone pickup unit 23 and with the playing face 28 of the harmonica 19 projecting outwardly of the body of the casing 11, through the open throat 29 thereof, so that the playing face 28 of the harmonica is readily accessible to the player.

To assemble the new harmonica apparatus or unit 10 the amplier microphone pickup 23 may be readily mounted in the receptacle or well provided by the generally annular-shaped rib 18 and the outwardly flared portions 15 of the side walls 12 of the casing by forcing the resilient clamping ring 27 downwardly, upon the generally annular-shaped rib 18, so that the upper edge portion of the rib 18 engages in an annular shoulder 30 formed in the clamping ring 27 and so that the skirt 31 of the clamping ring 27 extends downwardly inside of and is slightly compressed within and frictionally engages the inner surface of the generally annular-shaped rib 18.

When it is desired to disassemble the new harmonica apparatus or unit 10 this may be readily accomplished by merely withdrawing the harmonica 19 from the body of the holder casing 11, through the open throat 29 thereof, and then merely withdrawing the yieldable rubber or like clamping ring 27 from the receptacle or well provided by the generally annular-shaped rib 18 and the outwardly flared portions 15 of the side walls 12 of the holder casing 11.

When the parts are arranged as shown in the drawing, the amplifier pickup unit 23 is disposed immediately below and centrally of the harmonica 19 and the amplifier pickup unit 23 may be electrically connected by a suitable conductor 24, and jack, not shown, to any suitable amplifier unit and loud speaker therefor, such, for example, as the loud speaker of a radio receiver apparatus, or the like. To this end an electrical conductor cord 24 extends through an opening 25 formed in one wall 12 of the holder casing 11, adjacent the bottom wall 14 (Fig. 4).

When the assembled holder casing 11, harmonica 19, and amplifier unit 23 are held in the player's hands and played the musical sounds emanating from the harmonica 19 will be picked up by the amplifier or microphone pickup unit 23 and amplified in the form of electrical pulsations carried by and through the conductor 24 to a suitable loud speaker, not shown.

It will thus be seen from the foregoing description, considered in conjunction with the accompanying drawings, that the present invention provides a novel harmonica unit for an harmonica and amplifier microphone or pickup therefor, and a novel combination of a holder casing, harmonica and amplifier microphone or pickup, having the desirable advantages and characteristics, and accomplishing their intended objects, including those hereinbefore pointed out and others which are inherent in the invention.

I claim:

1. A holder unit for an harmonica and amplifier therefor comprising an elongated and generally rectangular - shaped casing including spaced generally parallel side walls and spaced generally parallel end walls and a bottom wall, said casing being open at the top for the reception of said harmonica therein, guide bosses formed at said end walls to open toward one another, each of said bosses defining an upwardly opening recess of a width and configuration to slidably receive and frictionally hold the ends of said harmonica to releasably position the same in said casing, and means arranged within said casing and between the bottom wall of the casing and the bottom of said harmonica for mounting an amplifier microphone pickup, said last-named means including an upstanding annular rib formed integral at the bottom of said casing.

2. A holder unit as defined in claim 1 in which each of said guide bosses is in the form of an outwardly projecting guide portion formed in each end wall thereof of reduced width, relative to the width of the body of said casing, and in which said outwardly projecting guide portions are adapted to slidably receive and guide the end portions of said harmonica.

3. A holder unit as defined in claim 1 in which each of said side walls has an outwardly flared portion formed therein, and in which said outwardly flared portions cooperate with said rib to provide a well for the reception of said amplifier pickup.

EDWARD A. ZIELINSKI.

References Cited in the file of this patent

UNITED STATES PATENTS

| Number | Name | Date |
|---|---|---|
| 2,486,264 | Armond | Oct. 25, 1949 |
| 2,565,100 | Tate | Aug. 21, 1951 |

FOREIGN PATENTS

| Number | Country | Date |
|---|---|---|
| 49,383 | Austria | Feb. 1911 |